United States Patent
Onishi et al.

(10) Patent No.: US 11,780,344 B2
(45) Date of Patent: Oct. 10, 2023

(54) MANAGEMENT APPARATUS FOR BATTERY OF ELECTRIC VEHICLE

(71) Applicant: TOYOTA JIDOSHA KABUSHIKI KAISHA, Toyota (JP)

(72) Inventors: Yoichi Onishi, Okazaki (JP); Makoto Kakuchi, Toyota (JP); Masashi Takahashi, Nagoya (JP); Masakazu Habu, Toyota (JP); Kenji Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 17/396,858

(22) Filed: Aug. 9, 2021

(65) Prior Publication Data

US 2022/0097546 A1 Mar. 31, 2022

(30) Foreign Application Priority Data

Sep. 25, 2020 (JP) ................................ 2020-160933

(51) Int. Cl.
*B60L 53/62* (2019.01)
*B60L 58/12* (2019.01)

(52) U.S. Cl.
CPC ............... *B60L 53/62* (2019.02); *B60L 58/12* (2019.02)

(58) Field of Classification Search
CPC .......... B60L 53/62; B60L 58/12; B60L 58/13; B60L 53/65; B60L 2240/54; Y02T 10/70; Y02T 10/7072; Y02T 10/92; Y02T 90/12

USPC ......................................................... 320/109
See application file for complete search history.

(56) References Cited

U.S. PATENT DOCUMENTS

| 2012/0293122 A1* | 11/2012 | Murawaka ............. B60L 53/64 320/109 |
| 2013/0289821 A1* | 10/2013 | Nakagawa ............... B60L 3/12 701/1 |
| 2014/0320144 A1 | 10/2014 | Nakaya |
| 2015/0149015 A1 | 5/2015 | Nakano et al. |
| 2021/0203177 A1* | 7/2021 | Peng ....................... B60L 53/63 |

FOREIGN PATENT DOCUMENTS

| CN | 107627872 A | 1/2018 |
| CN | 110008235 A | 7/2019 |
| DE | 102015211268 A1 | 12/2016 |

(Continued)

*Primary Examiner* — Paul Dinh
(74) *Attorney, Agent, or Firm* — Oliff PLC

(57) ABSTRACT

A management apparatus is configured to adjust an upper limit amount of electric power for charging. The management apparatus may be provided in an electric vehicle or a charging apparatus. The management apparatus may include a dial for adjusting the upper limit amount of electric power, and a user may be able to adjust the upper limit amount of electric power by operating the dial. A user who drives 300 km per week for commute may set the amount of electric power corresponding to 300 km (plus extra travel distance) for the upper limit amount of electric power. The user may connect a battery to the charging apparatus on weekends. When the battery has a capacity to store the amount of electric power corresponding to, for example, 500 km, the management apparatus may stop charging when the battery is charged with the set upper limit amount of electric power.

4 Claims, 3 Drawing Sheets

(56) References Cited

FOREIGN PATENT DOCUMENTS

| | | |
|---|---|---|
| JP | 2013-140631 A | 7/2013 |
| JP | 2014-014239 A | 1/2014 |
| JP | 2018-055793 A | 4/2018 |
| JP | 2019-140908 A | 8/2019 |

* cited by examiner

MANAGEMENT APPARATUS FOR BATTERY OF ELECTRIC VEHICLE

CROSS-REFERENCE TO RELATED APPLICATION

This application claims priority to Japanese Patent Application No. 2020-160933 filed on Sep. 25, 2020, incorporated herein by reference in its entirety.

BACKGROUND

1. Technical Field

The disclosure relates to a management apparatus for a battery of an electric vehicle. More specifically, the disclosure relates to a technology to suppress the degradation of a battery when an electric vehicle is scheduled to be used under severe service conditions.

2. Description of Related Art

An electric vehicle is equipped with a battery (rechargeable secondary battery) that supplies electric power to a drive motor. The degradation of the battery depends on a way of use. Batteries with a low level of degradation can be reused. Japanese Unexamined Patent Application Publication No. 2013-140631 (JP 2013-140631 A) describes a technology to predict the level of degradation. Japanese Unexamined Patent Application Publication No. 2018-055793 (JP 2018-055793 A) describes a technology to, in an electric vehicle equipped with a used battery, make it possible to use the used battery as long as possible by limiting the input and output power of the battery according to the level of degradation.

SUMMARY

The progress of degradation of a battery depends on a way of use of an electric vehicle. Batteries of electric vehicles used under severe service conditions degrade fast, and batteries of electric vehicles with a low frequency of use degrade slowly. Batteries with excessive degradation are not suitable for reuse. The disclosure provides a technology to suppress the degradation of a battery of an electric vehicle when the electric vehicle is scheduled to be used under severe service conditions. The possibility of reuse of batteries when electric vehicles are sold increases when the degradation of the batteries is suppressed.

An aspect of the disclosure relates to a management apparatus. The management apparatus includes a processor configured to adjust an upper limit amount of electric power for charging in accordance with a scheduled operating condition of the electric vehicle. The management apparatus may be provided in an electric vehicle or may be provided in a charging apparatus. For example, the management apparatus includes a dial for adjusting the upper limit amount of electric power, and a user adjusts the upper limit amount of electric power by operating the dial. For example, a user who drives 300 km per week for commute sets the amount of electric power corresponding to 300 km (plus extra travel distance) for the upper limit amount of electric power. The user connects a battery to the charging apparatus on weekends. When the battery has a capacity to store the amount of electric power corresponding to, for example, 500 km, the management apparatus stops charging when the battery is charged with the amount of electric power corresponding to 300 km (plus extra travel distance). By suppressing the upper limit amount of electric power for charging, the degradation of the battery to be frequently charged is suppressed. In the case of the above example, the condition "a travel distance per week is 300 km" corresponds to the scheduled operating condition.

In the management apparatus, the processor may be configured to acquire operating information indicating the scheduled operating condition of the electric vehicle and automatically determine the upper limit amount of electric power of the battery for charging based on the operating information. The management apparatus decreases the upper limit amount of electric power when the scheduled operating condition described in the operating information is high. When the scheduled operating condition is determined, the degradation of the battery is suppressed without any burden on the user.

In one example of the management apparatus, the operation information may include a scheduled travel distance of the electric vehicle per unit period, and the processor may be configured to lower the upper limit amount of electric power as the scheduled travel distance extends. A user who drives a long distance for a certain period (that is, a user who uses the battery under severe service conditions) is prompted to charge the battery as often as possible by lowering the upper limit amount of electric power. The user is forced to charge the battery as often as possible; however, the degradation of the battery is suppressed by lowering the upper limit amount of electric power.

The battery degrades even when a remaining amount of electric power (state of charge: SOC) excessively decreases. Then, the management apparatus may further include a memory configured to store the number of times where a remaining amount of electric power in the battery becomes lower than a predetermined lower limit threshold capacity. The number of times where a residual amount of electric power becomes lower than the lower limit threshold capacity can be used as an index indicating the degradation of the battery.

When the technology described in the disclosure is applied to a frequently-used electric vehicle, such as a commercial vehicle that travels along the same route every day, the degradation of the battery is effectively suppressed. There is a high possibility that batteries with a low level of degradation are collected and reused. The details of the technology described in the disclosure and further improvement will be described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A management apparatus of a first embodiment will be described with reference to the accompanying drawings.

Figure 1:
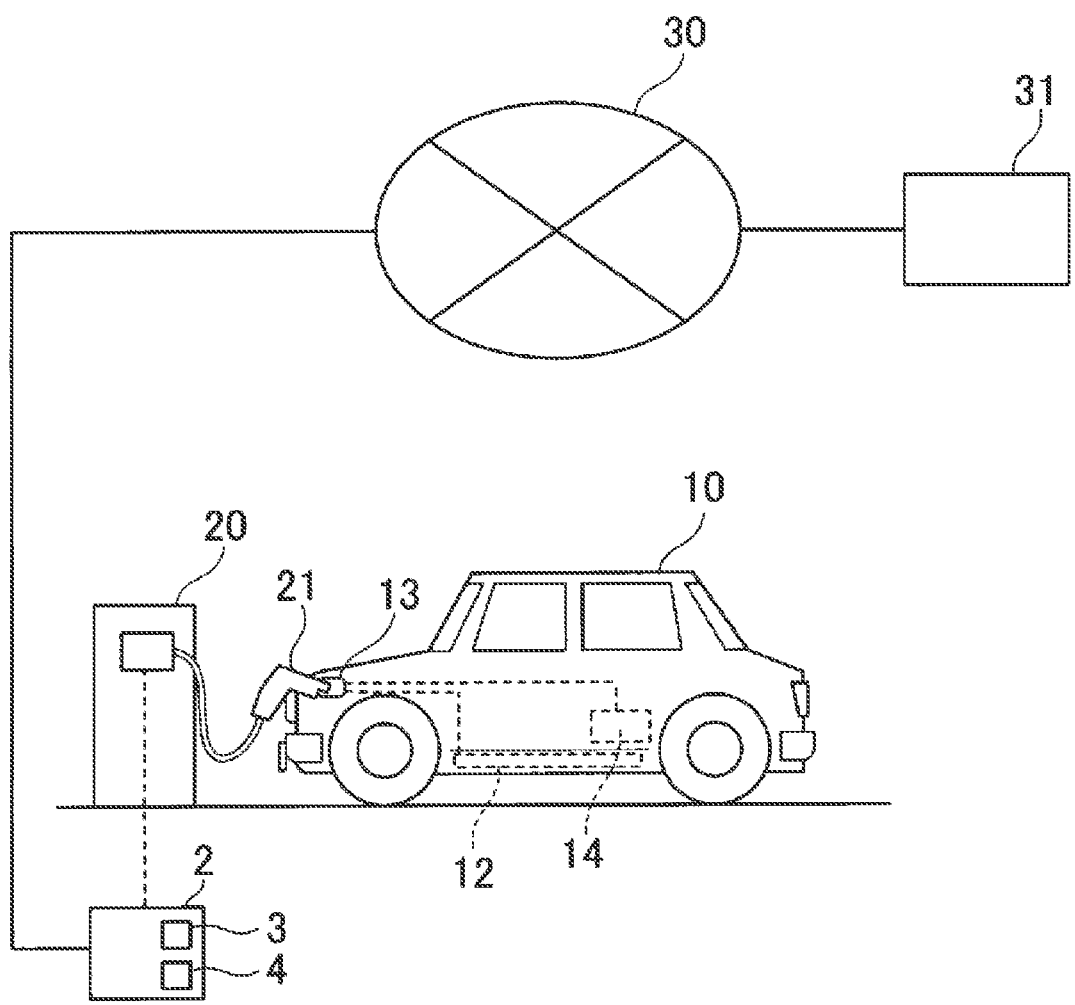
FIG. 1 is a block diagram of a management apparatus of a first embodiment and an electric vehicle equipped with a battery to be managed.

FIG. 1 is a block diagram of a management apparatus 2 and an electric vehicle 10 equipped with a battery 12.

The management apparatus 2 of the embodiment is provided in a charging apparatus 20 for charging the battery 12. The management apparatus 2 is a computer including a central processing unit (CPU) 3 and a memory 4. The management apparatus 2 implements functions to manage the battery 12 by running a program stored in the memory 4 on the central processing unit 3.

The management apparatus 2 is connected to a vehicle management server 31 via the Internet 30. The identification number and operating information of the electric vehicle 10 are entered in the vehicle management server 31 in advance. The identification number is a number assigned to the electric vehicle 10 in advance and is stored in the vehicle management server 31 and a controller 14 of the electric vehicle 10. The operating information is data to be input by a purchaser (or a user, or a provider) of the electric vehicle 10 and means information on a scheduled way of use (scheduled operating condition) of the electric vehicle 10. The operating information includes a scheduled travel distance of the electric vehicle 10 per unit period (per month or per year).

The identification number of the battery 12 is also stored in the vehicle management server 31. The identification number of the electric vehicle 10 equipped with the battery 12 is associated with the identification number of the battery 12.

The electric vehicle 10 includes the battery 12, the controller 14, and a charging inlet 13. The battery 12 supplies electric power to a drive motor (not shown). The charging inlet 13 is used to receive electric power supplied from the charging apparatus 20. The battery 12 is, for example, a lithium ion battery and is a rechargeable power supply. A charging plug 21 of the charging apparatus 20 is connected to the charging inlet 13, and electric power is supplied to the battery 12 through the charging plug 21 and the charging inlet 13.

Each of the charging plug 21 and the charging inlet 13 further includes a signal terminal. When the charging plug 21 is connected to the charging inlet 13, the management apparatus 2 and the controller 14 of the electric vehicle 10 are connected by a communication line through the charging plug 21 and the charging inlet 13. In other words, the management apparatus 2 and the controller 14 are able to communicate with each other.

The management apparatus 2 determines the upper limit amount of electric power for charging the battery 12 in accordance with the operating information of the electric vehicle 10 connected to the charging apparatus 20. The charging apparatus 20 decreases the upper limit amount of electric power for the electric vehicle 10 scheduled to be used under severe service conditions to reduce the rate of degradation of the battery 12. When the electric vehicle 10 is scheduled to be used under severe service conditions, the rate of degradation of the battery 12 is reduced by reducing the upper limit amount of electric power. Thus, the reuse value of the battery 12 is enhanced.

Figure 2:
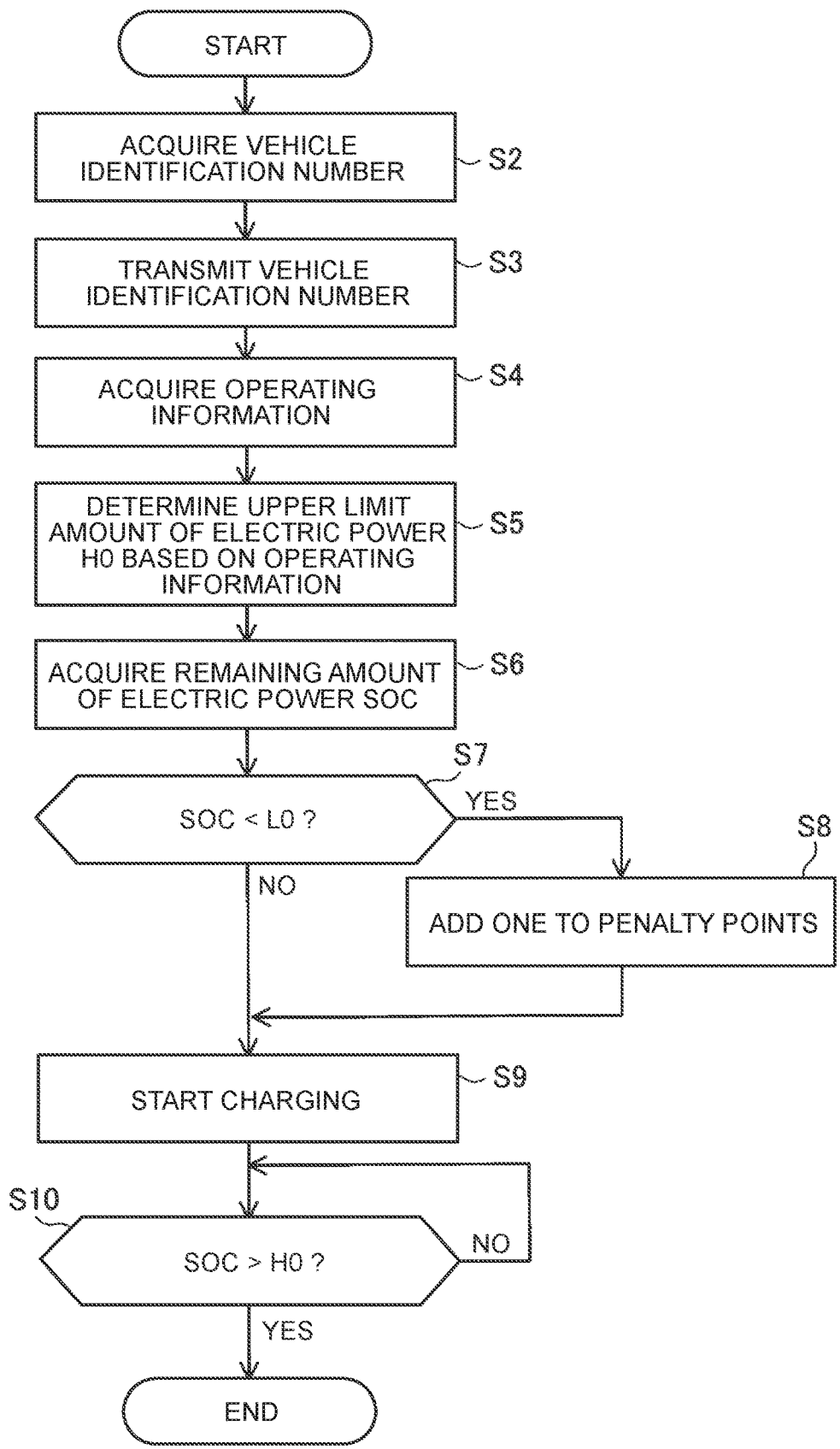
FIG. 2 is a flowchart of a process to be executed by the management apparatus.

FIG. 2 is a flowchart of a process to be executed by the management apparatus 2. The process of FIG. 2 is started when the charging plug 21 is connected to the charging inlet 13 of the electric vehicle 10 and the management apparatus 2 and the controller 14 are able to communicate with each other.

The management apparatus 2 connected to the controller 14 acquires the identification number (vehicle identification number) of the electric vehicle 10 from the controller 14 (step S2). Subsequently, the management apparatus 2 transmits the acquired vehicle identification number to the vehicle management server 31 via the Internet 30 (step S3). When the vehicle management server 31 acquires the vehicle identification number of the electric vehicle 10, the vehicle management server 31 transmits the identification number of the battery 12 (battery identification number) associated with the vehicle identification number and the operating information associated with the vehicle identification number to the management apparatus 2. The management apparatus 2 acquires the operating information and the battery identification number, transmitted from the vehicle management server 31 (step S4).

The management apparatus 2 determines the upper limit amount of electric power H0 of the battery 12 based on the acquired operating information (step S5). Specifically, the management apparatus 2 reduces the upper limit amount of electric power H0 as the scheduled travel distance per unit period, included in the operating information, extends.

As the scheduled travel distance per unit period extends, it is estimated that the frequency of charge of the battery 12 increases. As the frequency of charge of the battery 12 increases, the battery 12 degrades. On the other hand, as the upper limit amount of electric power for charging reduces, the rate of degradation of the battery 12 is reduced. By reducing the upper limit amount of electric power as the scheduled travel distance extends, the rate of degradation of the battery 12 is reduced. As a result, the possibility of reuse of the battery 12 mounted on the electric vehicle 10 that travels a long distance is raised.

After the upper limit amount of electric power H0 is determined, the management apparatus 2 acquires the remaining amount of electric power (state of charge (SOC)) of the battery 12 (step S6). The remaining amount of electric power SOC is obtained from the output voltage of the battery 12. The controller 14 measures the output voltage of the battery 12 and obtains the remaining amount of electric power SOC. The obtained remaining amount of electric power SOC is transmitted to the management apparatus 2.

When the remaining amount of electric power SOC is lower than the predetermined lower limit threshold capacity L0, the management apparatus 2 adds one to the penalty points of the battery 12 (YES in step S7, and step S8). The penalty points is a variable associated with the battery identification number and is stored in the vehicle management server 31. The battery 12 degrades when the remaining amount of electric power SOC is lower than the lower limit threshold capacity L0. The battery 12 degrades as the number of times the remaining amount of electric power SOC becomes lower than the lower limit threshold capacity L0 increases. The penalty points associated with the battery identification number indicates the number of times the remaining amount of electric power SOC of the battery 12 becomes lower than the lower limit threshold capacity L0. It turns out that the degradation of the battery 12 is more advanced as the penalty points increases. The penalty points is referenced at the time of reuse of the battery 12 as an index indicating the progress of the degradation of the battery 12.

The penalty points is transmitted from the vehicle management server 31 to the management apparatus 2 together with the battery identification number in step S4. The management apparatus 2 transmits the added penalty points to the vehicle management server 31 together with the battery identification number. The vehicle management server 31 updates old penalty points with the received new penalty points.

Subsequently, the management apparatus 2 starts charging (step S9). When the remaining amount of electric power SOC of the battery 12 reaches the upper limit amount of electric power H0 determined in step S5, the management apparatus 2 stops charging (YES in step S10).

The management apparatus 2 lowers the upper limit amount of electric power H0 for charging as the scheduled travel distance per unit period extends. As the scheduled travel distance per unit period extends, the frequency of charge of the battery 12 increases. The management apparatus 2 lowers the upper limit amount of electric power H0 for charging the battery 12 as the frequency of charge increases. When the upper limit amount of electric power H0 for charging is lowered, the rate of degradation of the battery 12 is reduced although the frequency of charge is high. A user who drives a long distance for a certain period (that is, a user who uses the battery 12 under severe service conditions) is prompted to charge the battery 12 as often as possible by lowering the upper limit amount of electric power H0. The user is forced to charge the battery 12 as often as possible; however, the degradation of the battery 12 to be used under severe service conditions is suppressed by lowering the upper limit amount of electric power H0 for charging.

The management apparatus 2 raises the upper limit amount of electric power H0 for charging as the scheduled travel distance per unit period shortens. Even when the upper limit amount of electric power H0 for charging is raised, the degradation of the battery 12 after a lapse of a long period is small when the frequency of charge is low. For the electric vehicle 10 with a low frequency of charge, the convenience of the electric vehicle 10 is increased by raising the upper limit amount of electric power H0.

Second Embodiment

Figure 3:
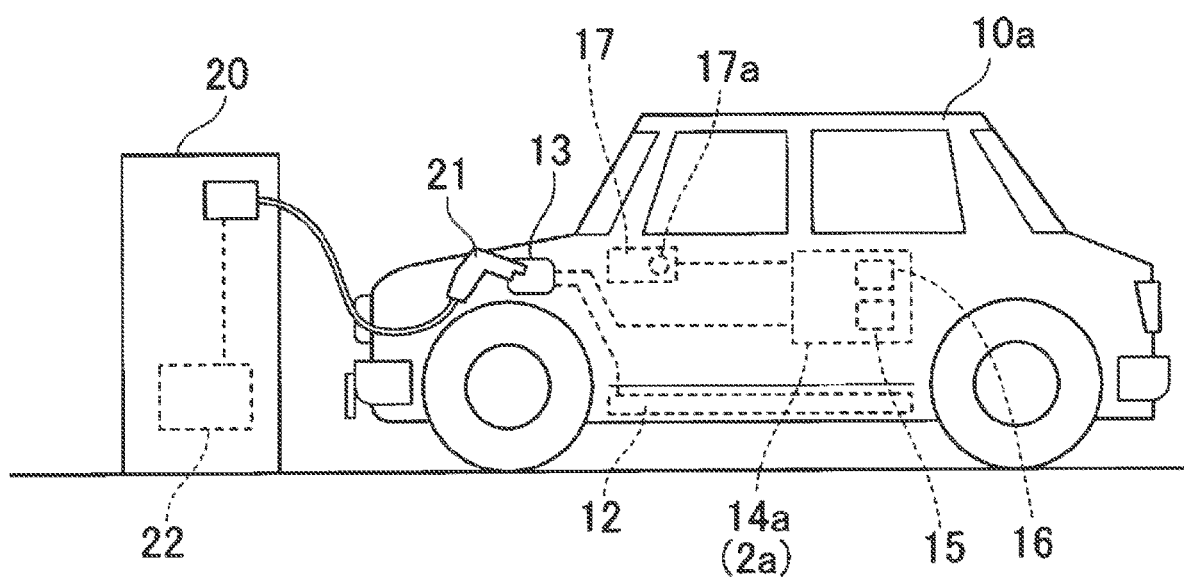
FIG. 3 is a block diagram of an electric vehicle equipped with a management apparatus of a second embodiment.

A management apparatus 2a of a second embodiment will be described with reference to FIG. 3. The management apparatus 2a of the second embodiment is implemented in a controller 14a of an electric vehicle 10a. The controller 14a is a computer including the central processing unit (CPU) 15 and the memory 16. The controller 14a functions as the management apparatus 2a by running a battery management program stored in the memory 16 on the central processing unit 15. A program for controlling the travel of the electric vehicle 10 and other programs are also stored in the memory 16. When the central processing unit 15 runs the program for travel control, the electric vehicle 10 is able to travel by using a motor (not shown).

An operation panel 17 is connected to the management apparatus 2a (controller 14a). The operation panel 17 has a dial 17a for adjusting the upper limit amount of electric power of the battery 12. When a user operates the dial 17a while the controller 14a is functioning as the management apparatus 2a, the upper limit amount of electric power stored in the management apparatus 2a is adjusted. The management apparatus 2a monitors the remaining amount of electric power SOC of the battery 12 while the charging apparatus 20 is supplying electric power to the battery 12. When the remaining amount of electric power SOC reaches the adjusted upper limit amount of electric power, the management apparatus 2a (controller 14a) transmits a command to a computer 22 of the charging apparatus 20 to stop supply of electric power. The battery 12 is only charged to the adjusted upper limit amount of electric power.

With the management apparatus 2a of the second embodiment, a user of the electric vehicle 10 is able to freely adjust the upper limit amount of electric power of the battery 12. The user is able to adjust the upper limit amount of electric power for his or her own reasons. For example, a user who drives 300 km per week for commute sets the amount of electric power corresponding to 300 km (plus extra travel distance) for the upper limit amount of electric power. The user connects the battery 12 to the charging apparatus 20 on weekends. When the battery 12 has a capacity to store the amount of electric power corresponding to, for example, 500 km, the management apparatus 2a (controller 14a) stops charging when the battery 12 is charged with the amount of electric power corresponding to 300 km (plus extra travel distance). By suppressing the upper limit amount of electric power for charging, the degradation of the battery 12 to be frequently charged is suppressed. In the case of the above example, the condition "a travel distance per week is 300 km" corresponds to the scheduled operating condition.

Points to remember related to the technology described in the embodiments will be described. The management apparatus 2 of the first embodiment may be mounted on an electric vehicle. A controller of the electric vehicle may also function as the management apparatus. Since the identification number of the electric vehicle is stored in advance in the controller, the process of step S2 of FIG. 2 may be omitted.

The operating information may be stored in the controller of the electric vehicle in advance. In this case, the processes of step S3 and step S4 in FIG. 2 may also be omitted. The functions of the management apparatus may be implemented in a computer attached to the battery. The management apparatus 2a of the second embodiment may be implemented in a charging apparatus.

The management apparatus may divide a scheduled travel distance into some ranges and assign an upper limit amount of electric power of the battery to each range. In this case as well, a lower upper limit amount of electric power is assigned to the range of a longer scheduled travel distance.

The management apparatus 2 (or the controller 14 of the electric vehicle 10) may store the travel history and charge history of the electric vehicle 10 and determine a future scheduled travel distance (that is, operating information) per unit period of the electric vehicle 10 in accordance with those pieces of information. Specifically, the management apparatus 2 (or the controller 14 of the electric vehicle 10) may use a past travel distance per day (per month or per year) of the electric vehicle 10 as a future scheduled travel distance per unit period. In this case, the management apparatus 2 is able to acquire a scheduled travel distance based on the travel history of the electric vehicle 10 equipped with the battery 12. The management apparatus 2 determines the upper limit amount of electric power for charging based on the acquired scheduled travel distance.

In the first embodiment, the penalty points of the battery 12 is stored in the vehicle management server 31. In this case, the vehicle management server 31 storing the penalty points is also regarded as part of the management apparatus 2. In other words, the management apparatus 2 stores the penalty points of the battery 12.

The operating information indicating the scheduled operating condition of an electric vehicle may include information, such as a route to be travelled every day, the maximum value and average value of an acceleration when the route is travelled, and a frequently used charging station. The acceleration of the electric vehicle corresponds to the output power of the battery. A large change in the output power of the battery also accelerates the degradation. The operating information may include a change in the output power of the battery.

The management apparatus 2 of the first embodiment suppresses the degradation of the battery 12 of the electric vehicle 10 scheduled to be used under severe service conditions. In other words, the management apparatus 2 suppresses the degradation of the battery of the electric vehicle (battery that supplies electric power to the drive motor) with a long scheduled travel distance per unit period. A user whose scheduled travel distance per unit period is long (in other words, a user who uses the battery under severe service conditions) is forced to charge the battery as often as possible by lowering the upper limit amount of electric power. However, the degradation of the battery is suppressed by lowering the upper limit amount of electric power for charging, and the value of the used battery rises.

When the degradation of the battery with a high frequency of charge is suppressed, the reuse value of the battery is raised when the electric vehicle equipped with the battery is sold. Even when the quality (quality after degradation) of an electric vehicle except a battery is low, but when the quality (quality after degradation) of the battery is high, only the battery can be reused.

Specific examples of the disclosure are described in detail above; however, these are only illustrative and are not intended to limit the appended claims. The technology described in the appended claims also encompasses various modifications and changes from the specific examples illustrated above. The technical elements described in the specification or the drawings exhibit technical usability solely or various combinations and are not limited to combinations of the appended claims at the time of filing the application. The technology illustrated in the specification and drawings can achieve multiple purposes at the same time and has technical usability by achieving one of those purposes.

What is claimed is:

1. A management apparatus for a battery of an electric vehicle, the management apparatus comprising:
    a memory configured to store a program thereon; and
    a processor connected to the memory, wherein the processor is configured to execute the program for
        acquiring a scheduled travel distance of the electric vehicle per unit period, and
        reducing an upper limit amount of electric power for charging the battery as the scheduled travel distance per unit period increases.

2. The management apparatus according to claim 1, wherein the memory is configured to store the number of times where a remaining amount of electric power in the battery becomes lower than a predetermined lower limit threshold capacity.

3. The management apparatus according to claim 1, wherein the processor is configured to transmit a command to a charging apparatus for charging the battery of the electric vehicle to stop supply of electric power in response to a retaining amount of electric power reaching the upper limit amount of electric power for charging the battery.

4. The management apparatus according to claim 1, wherein the processor is configured to estimate the scheduled travel distance of the electric vehicle per unit period based on a past travel distance per day of the electric vehicle, a past travel distance per month of the electric vehicle, or a past travel distance per year of the electric vehicle.

* * * * *